United States Patent
Leapaldt et al.

(10) Patent No.: US 6,757,688 B1
(45) Date of Patent: Jun. 29, 2004

(54) ENHANCEMENT FOR MULTI-LINGUAL RECORD PROCESSING

(75) Inventors: Bernell A. Leapaldt, Eden Prairie, MN (US); Gregory N. Nesheim, Eagan, MN (US); Hong Li, Lakeville, MN (US)

(73) Assignee: Unisys Corporation, Blue Bell, PA (US)

( * ) Notice: Subject to any disclaimer, the term of this patent is extended or adjusted under 35 U.S.C. 154(b) by 420 days.

(21) Appl. No.: 09/939,473

(22) Filed: Aug. 24, 2001

(51) Int. Cl.$^7$ ................................................ G06F 17/30
(52) U.S. Cl. ...................... 707/101; 707/100; 707/104; 707/9; 707/10; 704/8; 715/536
(58) Field of Search ................... 715/536; 704/2, 704/8; 707/104, 10, 2, 3, 9, 100, 101; 345/866, 762

(56) References Cited

U.S. PATENT DOCUMENTS

| | | | | |
|---|---|---|---|---|
| 5,157,606 A | * | 10/1992 | Nagashima | 704/2 |
| 5,758,314 A | * | 5/1998 | McKenna | 704/8 |
| 5,768,589 A | * | 6/1998 | Bradley et al. | 707/2 |
| 5,787,452 A | * | 7/1998 | McKenna | 715/536 |
| 5,873,111 A | * | 2/1999 | Edberg | 715/536 |
| 6,134,544 A | * | 10/2000 | Glitho et al. | 707/3 |
| 6,226,649 B1 | * | 5/2001 | Bodamer et al. | 707/104.1 |
| 6,266,055 B1 | * | 7/2001 | Mozdzer et al. | 345/866 |
| 6,307,571 B2 | * | 10/2001 | Mozdzer et al. | 345/762 |

OTHER PUBLICATIONS

Kapustein, writing DLL function for VB4, Windows developer's journal, V7 n6, p 43(6), Jun. 1996.*
Davis et al., unicode, Systems, Man and Cybernetics, 1990 International Conference, IEEE, pp. 499–504, 1990.*
VAn Camp. D., "Unicode and software Globalization," Dr. Dobb's Journal, Mar. 1994. pp. 46, 48–50.*

* cited by examiner

Primary Examiner—Jean M. Corrielus
(74) Attorney, Agent, or Firm—Michael B. Atlass; Mark T. Starr (57) ABSTRACT

Customer record systems for multinational companies advantageously store both Latin character set (language of the database user) and customer-local language forms of the information so that mailings to customers can be accomplished with printing in the local language. Further, web access by customers into their information can also be displayed in local language format from this system. Limiting the local language storage to that information that is needed to communicate to the customer in customer's location provides full access to all transactional information to the owner or user of the database. Translating all customer information into Unicode provides a single uniform database into which these mixed language records can be stored. Variations in signaling to the translation mechanism are provided so that use of local language terminals can be used.

17 Claims, 5 Drawing Sheets

ENHANCEMENT FOR MULTI-LINGUAL RECORD PROCESSING

BACKGROUND OF THE INVENTION

1. Field of the Invention

This invention relates to databases and their use where certain users require independent international language capabilities and has particular applicability to international business records.

2. Background Information

As businesses have become internationalized, the ability of a business to be able to do business with customers around the world is of paramount importance. Therefore the ability to establish customer loyalty programs by using the mails for sending information, sales promotions, policy changes and the like, or even billing statements, to individual customers throughout the world should be easily accomplished. However, this seemingly simple business task is significantly hampered when the database keeps records for individuals in languages that are not local to the country and culture in which they reside. Even a superficial review of the basic characteristics of ten (10) of the common language scripts or writing sets provides a window into the difficulties, particularly in providing things like addressing for envelopes to be mailed to customers around the world. The languages that come from Latin for instance are alphabetic (such as English, French, Italian, and German), as are the Cerulean Greek languages. However, Chinese, Japanese, Korean, Tai, Indic, Hebrew and Arabic languages are not alphabetic languages. Japanese and Korean languages are syllabic in form, but none of the other languages are. Tai and Indic languages are semi-syllabic with vowel signs, and Hebrew and Arabic are consonantal. Only the Chinese, Japanese, and Korean languages use ideograms (like Kanji) and Korean doesn't use as many ideographic characters as Japanese, with some Korean documents having no ideograms at all.

In just looking at the characters, multi-byte representation is required for Chinese, Japanese, and Korean, and multi-byte character representation is also required for sub-sets of Latin languages if they are to include all pre-composed accented Latin characters. In five (5) of the ten (10) language groups mentioned, non-European numerals are in use. And in two (2) of them the text is typically right justified and bi-directional. Spacing, word wrapping, and justification vary all over the map for the ten (10) language groups.

However, in thinking about the requirements in keeping business records in a database, one may parse the kinds of data kept and simplify the problem based on a taxonomy of information types one develops. Accordingly, many of the concerns, which appear in viewing the languages as text documents, disappear. For example, flight information will in the foreseeable future always be in English (Latin character set), or at least the part of it that is used for the airline-accepted codes for airports (MSP=Minneapolis St. Paul International Airport, for example), and the flight times and similar information is are all standardized in format. Also, one need not write entire sentences to store addresses and names for an airline customer, although having such information in a local country language format can be critical for getting country mailings to such customers. Therefore one does not need to account for rules of grammar, and various other niceties one usually associates with translating text. Accordingly, many of the problems one commonly imagines need to be resolved to have some information communicated accurately between languages can be avoided by viewing the problem in the limited manner of one that make available nothing but business records for retention and transmission.

Accordingly, through viewing the problem in its most basic sense, the inventor's have settled upon the use of Unicode, which provides a unique number (or code) for every character of every language. Thus, Unicode provides the underpinning of a system that covers the most basic requirements needed to solve the particular problem of being able to address mailings to customers, that is, storing any language text, while for all practical purposes avoiding any actual translation costs.

Thus, many of the complexities described for language translation and developing a system for collation in a data processing system having distinct sets of information such as in U.S. Pat. Nos. 5,157,606 and 5,873,111 are avoided with this invention.

With this perspective, the mailing information in local language form will be the only thing needed to be retained to establish complex customer loyalty systems and to handle most customer transactions and to make such systems work in the international business arena. How this is applied in practice will be discussed below.

SUMMARY OF THE INVENTION

To the best of our knowledge, all non-Unicode databases that operate using more than one language are defined to support only one character code set. Each character code set supports the Latin character set, plus a specified local character set. For example, Latin plus Korean or Latin plus Polish or Latin plus Hebrew. This technique for handling two languages with a single code set has a limitation in that it can only support the one local language character set (LL) in addition to the Latin character set (LCS). In its preferred form, this invention presumes that a user company can employ multiple local language character sets for its database system. In addition to the Latin character set, entry of data into customer's records in the database will then occur either in the Latin character set or in the local language of the customer, i.e., where the customer lives or receives his or her mail. At a minimum, the address for the customer must be entered in the local language. Thus, the logical customer record in the business's database contains information in the Latin character set about the customer as well as the customer address in the local language of the customer. In many systems in the world today, local language terminals are used to enter data in a local language format and the Latin character set. The problem is these systems are restricted to only one local language character set, while a typical multinational business may require several or many such local language character sets to operate effectively. Translation to a Unicode character set allows a company to continue using a Latin character set for the transactional information about a customer, and at the same time, to retain local language character storage for the customer's addresses and any other information that may be deemed critical to have recorded in a local language character set, regardless of the number of local languages and local language terminal types used by customers. Also, the company using this invention can keep this customer record database storage at any location, regardless of whether that location has local language terminals. The key advantage to forcing the database to store data in Unicode is that a company can store customer information in the Latin Character set and also use any number of local language character sets for the various locales of its customers. For example, the company can then store a particular customer's address in a LCS and in Hebrew, and another customer's information in LCS and in Japanese characters. If desirable, certain pieces of information may be stored exclusively in a local character set while other pieces of information are stored in LCS format, thus avoiding any translation at all. Thus, the Unicode format as used by this invention changes the way information is stored and available for business activities to the company. Thus, local language terminals can exist in many locations or locales and input information into the customer record regarding customer transactions, customer credit history, and information of that nature which can be stored in the Latin character set in the customer record while at the same time maintain Unicode records which translate into the local language when read by a Unicode enabled system for printing billing, sales brochures, and other informative documents which must be sent by local language mail to the customer. Additionally, data for customers may be entered through Unicode web-enabled terminals, which provide Unicode output directly instead of having a requirement for the Unicode translator to be on the server translating the local language terminal input into Unicode. The Latin character set will also be used by the web-enabled terminals for the transaction related information critical to the company to keep track of the transactions and other data, which the company that owns the system requires of the customer. Use of the invention allows businesses, such as airlines and banks, to send out mailings with names and address in the local language characters to its customers. The system supports a multi-lingual database configured to support multi-local language addresses and names of customers listed along with Latin character set descriptions of other data from the customer file.

DETAILED DESCRIPTION OF THE PREFERRED EMBODIMENTS

Figure 1:
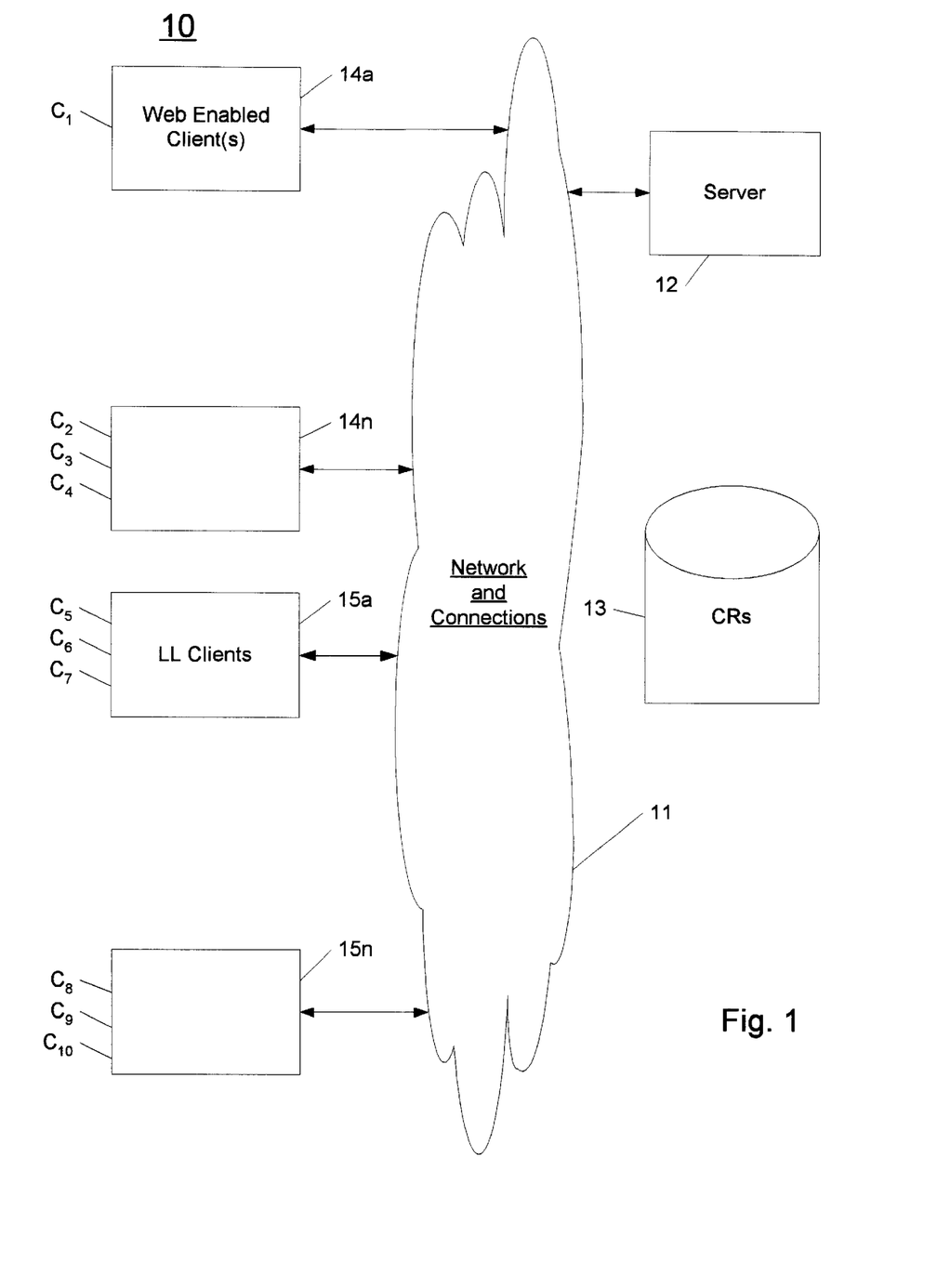
FIG. 1 is a block diagram of a server and database connected to various clients through which information about customers can be input into the database in accord with a preferred embodiment of the invention.

Please refer first to FIG. 1 in which the elements of the system 10 are broadly illustrated. A network or the Internet 11 operates as a conduit for data between the various clients and the system server 12 of the company employing the invention. The server is the only means for the clients ($C_{1-10}$) to access the customer records in the database 13. Thus, it will have various appropriate security features for identifying clients as appropriate and acceptable actors entitled to manipulate data in the customer records database. The clients in this generalized system diagram 10 are of two main types.

Local language server clients 15a–15n are typically local language terminals with local language keyboards, which are preferred by international companies. These local language terminals enable local language operators to connect (by telephone or in person, or possibly by other telecommunications means) to customers so that the operators can enter the information in the local language (LL) as well as the Latin character set (LCS). The local language information would be converted to Unicode by the server. The Latin characters are also stored in Unicode.

Basically, the local language characters are sent to the server, which uses a translation table (that in the case of CoolGen implementations, we had Computer Associates build for us, one for each local language) to translate each local language code page character code into a Unicode code for that character. The server program knows that it is receiving local language code based on an internal code page number of the client PC, which every Microsoft-run client PC has, indicating that the terminal is running with a particular language.

The other type of client useable with this invention is the web-enabled client 14a–14n. These clients may either be located at a customer site (such as web-enabled client 14a co-located with customer C1) or may provide for telephone links through an operator at a corporate operator site, such as web-enabled client 14n and customers C2, C3, and C4. In either case the web-enabled client would produce Unicode which itself contains an indication of the local language to provide data to the server 12 that provides the interface between the web-enabled clients to the customer record database 13.

In the preferred embodiments, we use a product called CoolGen manufactured by Computer Associates to translate the various codes, based on the "Microsoft Code Page", into Unicode for the local language terminal embodiments. (For example, for Korean the code page is 949. Code pages were nearly universally used prior to Unicode, each code page supporting 256 characters. This meant that the code for characters in Korean shared specific codes with different characters from all other different languages. Unicode has a single set of codes for each character in any language). The CoolGen code handles the translation based on enhancements to the CoolGen engine, translating a set of (for this example) Korean local language characters received with a code page indication of "949" into Unicode (version UTF8) for each Korean character. Specifically, the enhancements modified the CoolGen application server generation software to translate Microsoft code page code sets into Unicode, and to store the data as Unicode. (The enhancements also modified the CoolGen application generation software to translate from Unicode back to Microsoft code page code sets to enable another feature of this invention).

The Graphic User Interface (GUI) client (which is a local language terminal) sends the local language characters to the Server for translation to Unicode and storage into the customer record in the database. The Unicode itself contains a unique representation that this is Korean, or whatever local language it is, and the same is true for the Latin character set because each character in every language has a unique code in Unicode. Unicode itself uses between one and 4 bytes for these characters, depending on which character is being coded into Unicode. And Unicode interpretation is well established so further discussion of Unicode itself will not be had here.

When the system is using a web-enabled client, a JAVA language script takes input in Unicode and sends it to the server in Unicode. In these cases the web-enabled client transmits a "pseudo code page" which signifies Unicode format. For such cases the server code preferably will cause the input to not be translated. Without sending a "Unicode pseudo code page" as the terminal's code page, the translation will occur into whatever code page the web-enabled computer is using for its native language, and the translation will produce useless characters, since the web-enabled client is already sending Unicode. Therefore, when we establish a web-enabled client for sending information into the server, it is enabled to transmit the "Unicode pseudo code page" value, which is the signal, which indicates to the server not to translate the incoming code.

We have run web-enabled clients using Microsoft Explorer on the client side and BEA Systems Web Logic and Apache systems servers on the server side using this invention.

Figure 2A:
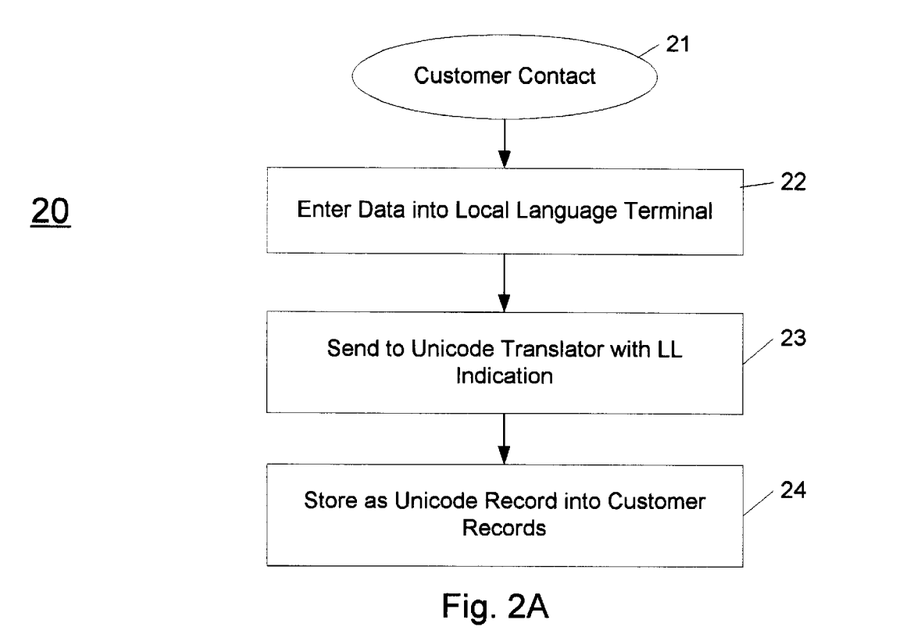
FIG. 2A is a flow diagram of the development of a customer record in accord with a preferred embodiment of this invention.

In FIG. 2A, the flow chart 20 illustrates how a customer, such as customer C8 from FIG. 1, would work through a corporate user such as a customer service agent at an airline, at local language client 15n. The customer first calls the customer service agent and establishes contact (Step 21). The customer service agent will enter the data into the local language terminal, in the example of an airline, to establish the customer loyalty account for the client 22 by inputting the local language information where needed. For transactions, the account is usually already established, but the customer service agent could also make modifications to the name or address during transaction handling as well. There may be some inquiry or transaction processing between the agent at the local language and the server (or some other computing facility within the host corporation) to enter information into a frequent flyer award program, to communicate with a credit card company to establish credit, and so forth. A bank or credit agency may enter information regarding job history, government identification numbers and the like during similar interviews in the same ways. Once the data is entered into the local language terminal, the operator or the terminal itself will send the local language data to the Unicode translator, typically at the corporate server 23. As discussed before, this data can be known to be in the local language by the server by virtue of the handshaking or other identification procedure between the server and the local language client, or by the inclusion of specific information indicating that a particular local language is being used. In the preferred embodiments, servers are set to by default look for the local language code page of the terminal and translate into Unicode, unless there is an indicator that this is a web-enabled client. In the case of the indicator for the web-enabled client, we prefer to simply set the code page as Unicode pseudo code page and use an arbitrary number to identify it, which will be the same for the server and no translation will be done, since the Java program will have sent the information in the Unicode format already.

It should be recognized that there are various ways in which the customer record can be established without direct customer contact, any of which could use this model of data entry by a local language-enabled terminal using an employee-operator. One example comes from the customer filling out a form in a magazine, mailing that form in to the corporation like a post-card and the company providing that card to a data entry operator or card reader to enter the information through a terminal available to the server. The customer form could be provided at the point of contact with the customer, such as in a bank line while the customer is waiting for teller service. The form could provide for enrollment into a customer loyalty program, which could be the first entry for this potential customer into the company's system. The resulting customer data entry will be of particular value in customer loyalty systems where customer status or opinion data can be kept updated, and service or gift bonuses awarded responsive to spurious customer input.

The server will then store the information into the customer record as Unicode for the local language 24. It may store the transactional information as Latin characters in Unicode.

Figure 2B:
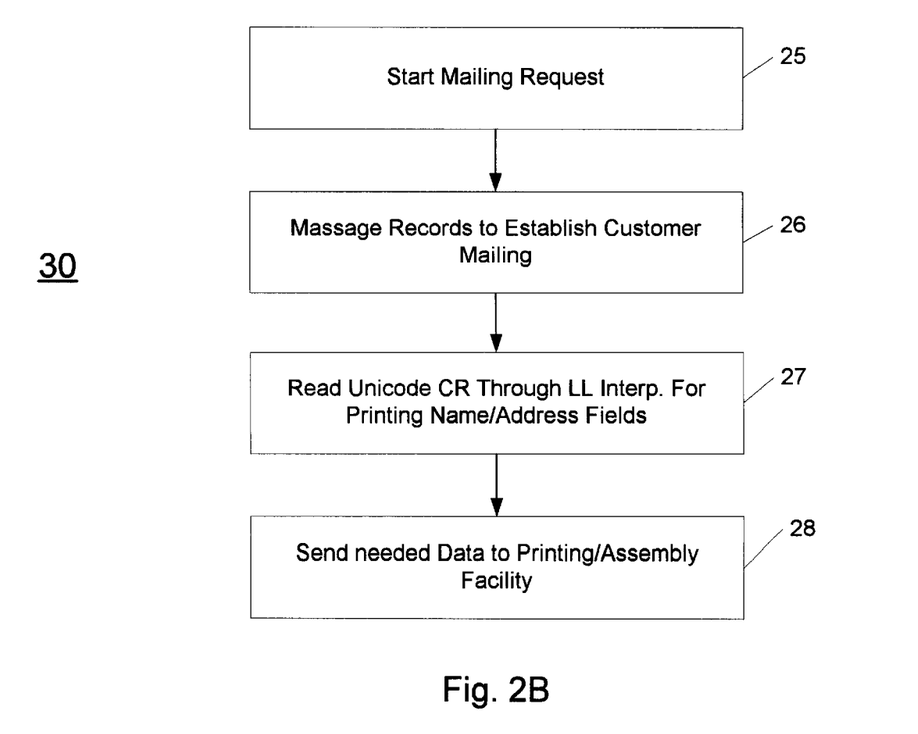
FIG. 2B is a flow diagram of the use of customer records to provide information to customers in accord with the preferred embodiment of the invention.

When the corporation desires to send a particular mailing either to a particular customer or to a class of customers, a corporate user starts a corporate mailing request 25. There are various reasons for such mailings and they may include offering incentives to purchase additional goods or services from the company, coupons or special offers for services provided by partner companies, reports on status of a customer with respect to frequent flier bonus miles, and the like. Typically, this will be initiated by the corporate owner of the database through any terminal with access to the server 12. It is even possible for the customer at a PC at home to initiate its own request for a mailing.

After appropriate authorization, the database system storing the customer records on the server will massage the records appropriately to establish the information required for the customer mailing 26. If for example all the customers with over 100,000 frequent flyer miles should be getting a brochure indicating that these miles can now be converted to credits at a particular facility at a particular airport, for example, no further information about the customer other than his name and address is required. If however a dunning notice or set of other activity records needs to be compiled for the mailing, the database will be queried for the relative customer records and the appropriate transaction data compiled for each customer in accord with well established and well known database manipulation procedures. Steps 27 and 28 can occur simultaneously or one after another in either order, depending on the company that owns the system and it's desires. The customer record data established in Step 26 needs to be printed and assembled and this can occur at a printing and assembling facility outside the company and to accomplish the printing and assembling, the local language printing facility and/or interpreter of Unicode into local language must be present so that the names and addresses and other fields needed for the mailing can be printed as required by Step 27.

Advantageously, the translation program should also be able to provide translation from Unicode back to the local language code page values to enable local printing houses to handle the mailings for companies, which use this invention. In other words, a data file of customer records needed for a mailing should be buildable from Unicode records back to local language records so that the outside company can print a mailing and handle the mailing in the local language if desired.

Figure 3A:
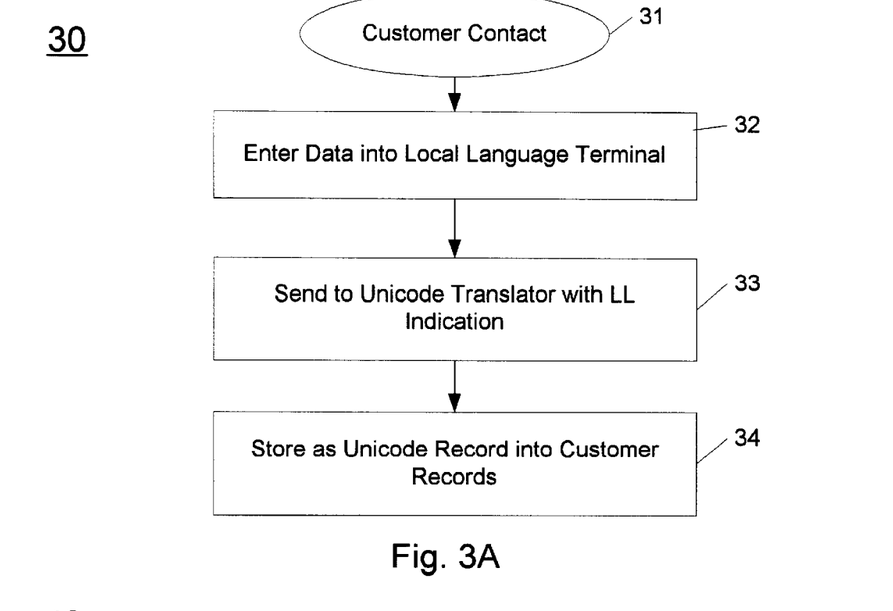
FIG. 3A is a second embodiment of the flow chart of FIG. 2A.
Figure 3B:
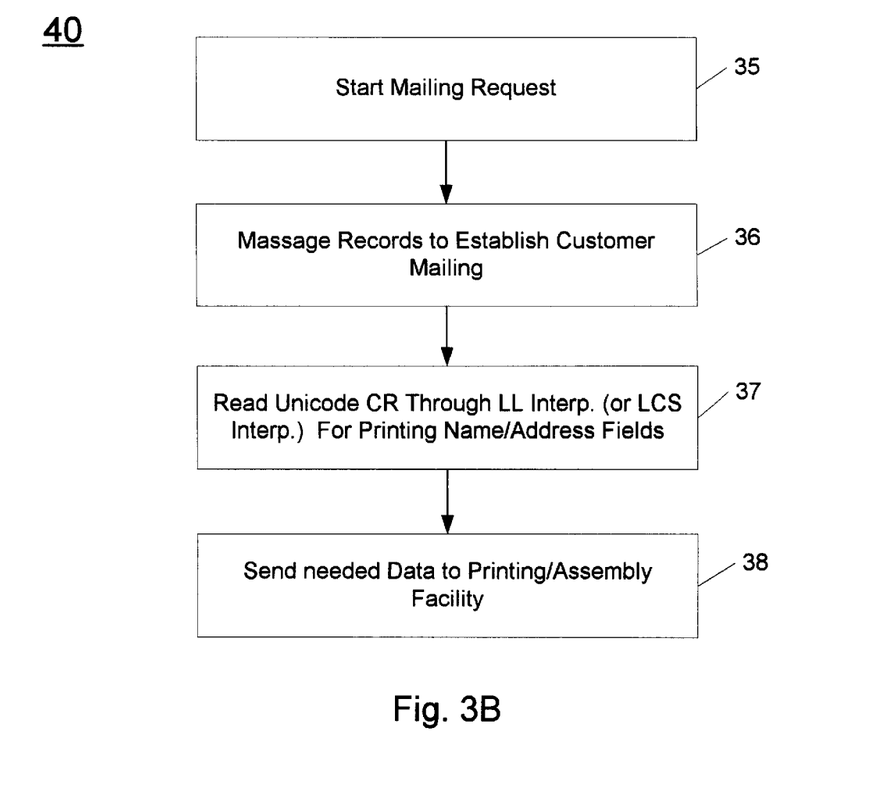
FIG. 3B is a flow chart of alternate embodiment for the flow chart of FIG. 2B.

FIGS. 3A and 3B illustrate nearly identical procedures as those described with reference to FIGS. 2A and 2B. In Step 31 of flow chart 40, the customer contact is made and in Step 32 the data is entered. Step 32 is unlike Step 22 in that data is entered through a web-enabled PC. Accordingly, in Step 33 the web-enabled PC will translate the local language input into Unicode and send both the local language and the Latin character set entries to the corporate server as Unicode. Flow chart 40 in FIG. 3B corresponds step-for-step to flow chart 30 of FIG. 2B such that Steps 35, 36, 37, and 38 correspond respectively to Steps 25, 26, 27, and 28.

Figure 4:
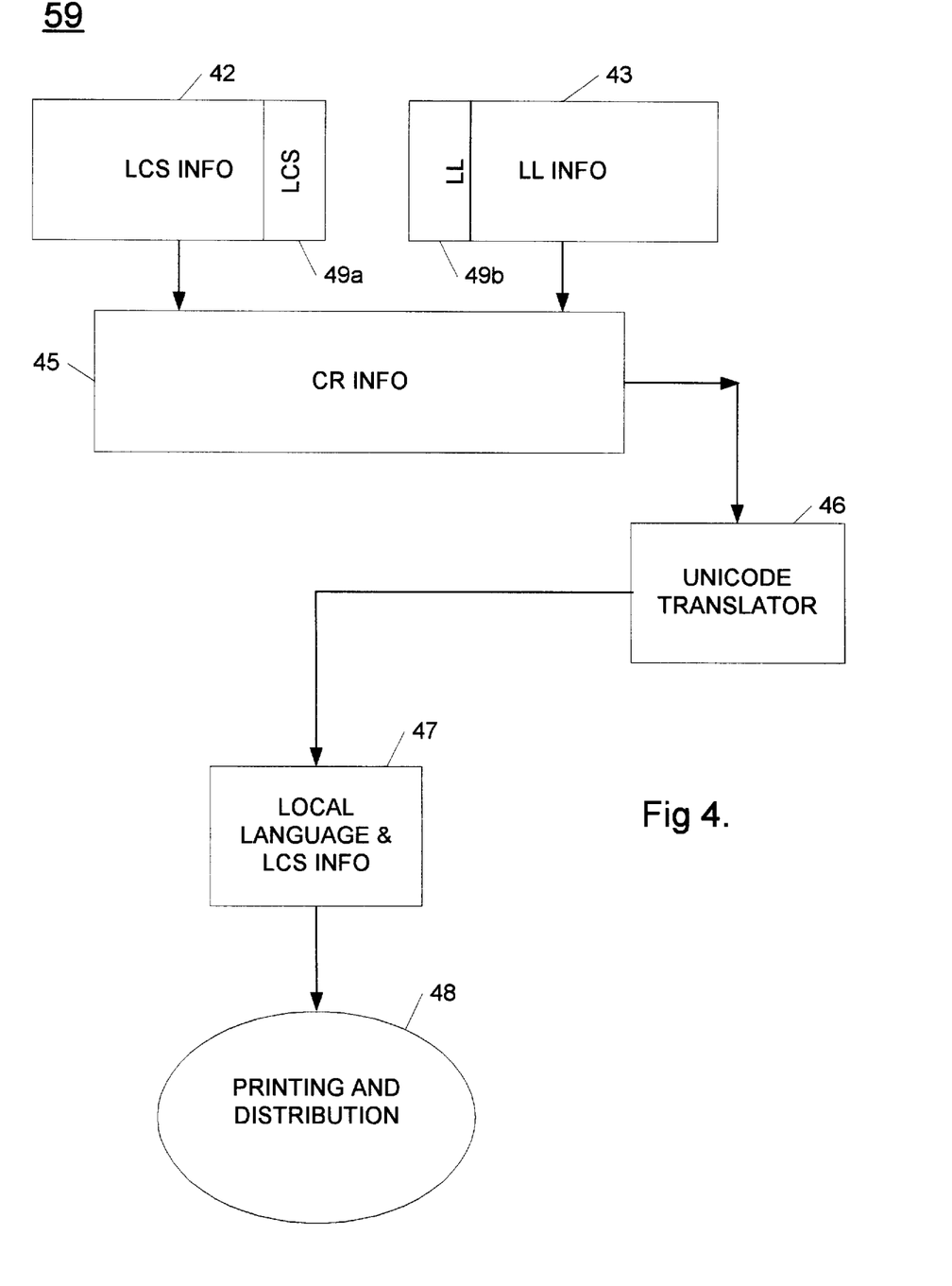
FIG. 4 is a block diagram illustrating the system components involved in developing a customer mailing in accord with the preferred embodiment of this invention.

Turning now to FIG. 4, the system 59, assumes components 42–48. Thus, the client will enter both Latin character set encoded information 42 and local language information 43 into the client record 45, which will exist on the corporate server. Latin character set tag 49A and local language tag 49B may be included in cases were both sets of characters are needed to provide sufficient information to operate a satisfactory translation. Typically this will be required for those cases where the information is required in both Latin and local language. For example, the local language address is required for mailings, however the address may also be used by an airline reservations system for ticketing purposes, and airline reservations require Latin characters. When a company is desirous of sending a mailing to a customer or to customers, or even of posting customer information on a corporate web site, it is appropriate to go through a Unicode translator 46 to turn the client record information into printable or visual local language information and Latin character set information 47. After this is accomplished, printing and distributing in whatever form desired 48 is possible.

Figure 5:
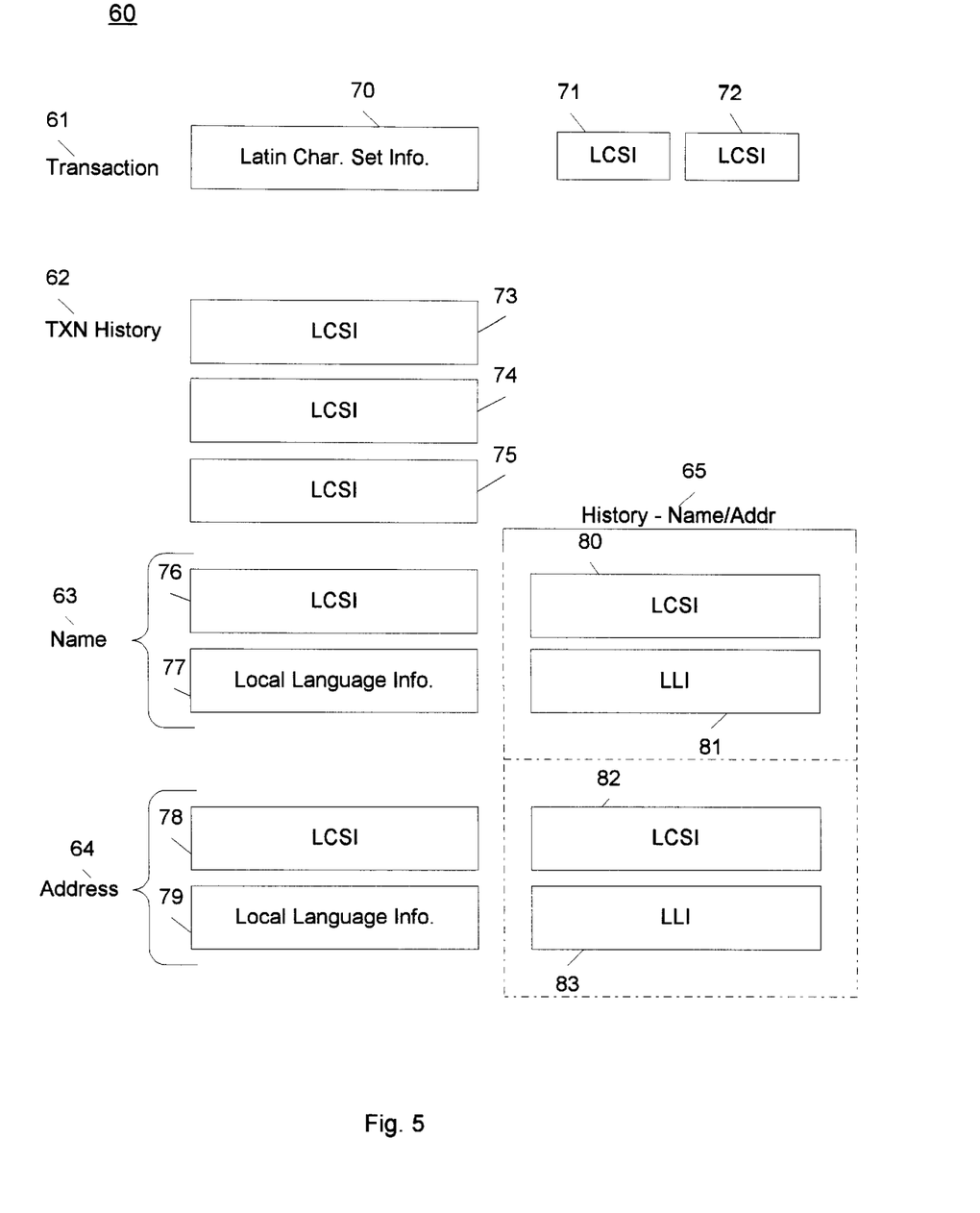
FIG. 5 is an exemplary customer file record for use in a database as described in accord with the preferred embodiment of this invention.

The customer record for each customer of the corporation using an inventive system will have components similar to those described with reference to customer record 60 in FIG. 5. The particular transaction 61 will be recorded in whatever component parts of the transaction are required (here as blocks 70, 71, and 72) in Latin character set information format. The customer record will have been accessed by the corporate user or by the customer himself using unique identifiers that may be located in the customer name record portion 63, the customer address portion 64, or some other unique identifier sub-record within or security feature associated with or attached to the customer record (not shown). All transactions have some record 73, 74, and 75 in a history sub-record 62 within the customer file. This will contain some or all of the type of information that was recorded in the transaction currently being managed in sub-record 61. It is preferable, but not necessary, to have the customer name and address be recorded in the customer file in both a Latin character set information format and a local language information format as illustrated here in FIG. 5 as sub-records 76–79. Thus sub-record 77 and 79 (the local language information format sub-records) stored in Unicode in the customer file 60, provide the necessary information to accomplish a mailing to the customer. Blocks 80–83 provide for historical or second set information related to customer name or address as indicated.

Additionally, one may also provide a unique alphanumeric or other code for every customer record, to enable better tracking and monitoring of the database.

Thus, the applicants have described a new method and apparatus for presenting and making available customer records and providing the capability for making customer mailings using local languages native to the customer's local address. Accordingly, the invention is limited only by the following appended claims.

What is claimed is:

1. A computer system for storing customer records so as to provide recall of information from said customer records in a local language and also in a Latin character set upon command by an owner of a database containing said customer records, said system comprising:

a computer-server controlling access to said database, said database having customer records, a said customer record comprising customer information comprising transactional information and local customer information, said local customer information being stored in Unicode, and said transactional information comprising data about customer transactions and being stored in Latin character set retrievable form, a customer interaction point comprising a computer terminal for inputting said customer information and for sending said customer information to said computer-server, and a translation program for translating input from said customer interaction point wherein if said local customer information is sent to said computer-server in a local language format, said translation program converts said local language input from a local language code sage format to a Unicode format, and if said local customer information is translated into Unicode at said client terminal, said translator is rendered inoperable with respect to said local customer information, and wherein whether said translation program is rendered inoperable or not, said local customer information is stored into said customer records in said database in Unicode, wherein said customer input point is a web-enabled computing device accessible directly by a customer, having a Unicode generator for generating Unicode signal values for local language characters, and wherein a pseudo Unicode code page for said web-enabled computing device is the same code page used by said computer-server, and wherein said web-enabled computing device communicates with said computer-server across a network.

2. The system of claim 1 wherein said local language customer information is customer address information.

3. The system of claim 1 wherein said local language customer information includes customer name information.

4. The system of claim 1 wherein said customer input point is a local language terminal controlled by said user of said database and which has a code page indicator different from the code page used by the computer-server.

5. The system of claim 1 wherein a code from the local language terminal provides a trigger to said translator to translate customer information into Latin character set format.

6. The system of claim 1 wherein said web-enabled computing device code page is Unicode pseudo code page, also known as UTF8.

7. The system of claim 1 further comprising a report generator program for generating reports about a customer and for providing local language information for printing so that said reports can be used to facilitate printing said local language about a customer on an envelope for mailing said reports about a customer to said customer.

8. The system of claim 7 wherein said reports may be information drawn from the set of information comprising: {advertising, targeted offers, billing statements, dunning notices, frequent flier mileage updates, customer surveys}.

9. The system of claim 1 further comprising a report generator program for generating reports about a customer and employing said translator to provide local language code page formatted data for sending to a local language print facility.

10. The system of claim 1 further comprising an electronic report facilitator program for providing local language information in code page format for printing so that said electronic reports can be used to facilitate printing said local language about a customer on an envelope for mailing said reports about a customer to said customer wherein a printing facility uses code page translation software for printing.

11. The system of claim 1 wherein the translation program is implemented in CoolGen.

12. The system of claim 1 wherein the translation program is implemented in Java and operates on a web-enabled client device.

13. A method for providing both local language and Latin character set formats for information in a customer record to users of a database comprising;

receiving customer information from a web-connected terminal to a server for said database for recording into said database in said local language, wherein each customer is given a unique code, readable in Latin character set, sending said customer information to a server, determining whether said customer information is received in Unicode or in a local language code page format, and if in local language code page format, providing that the code page format used at both the web-connected terminal and at said server are the same, and translating local language information into Unicode, if said customer information was received in local language format, recording the information into a database, retrieving said information in Unicode format.

14. The method of claim 13 wherein said recording step records the information into the database in Unicode format version UTF8.

15. The method of claim 13 further comprising accessing said database and producing therefrom a set of customer records for a mailing, reducing said set of customer records for a mailing to an electronic file and providing said electronic file to a printing facility, wherein said printing facility prints local language formatted customer addresses taken from said electronic file onto mailable materials.

16. The method of claim 15 wherein said electronic file is translated into local language code page for all local language customer information needed for local language formatted printing.

17. The method of claim 13 wherein said receiving step comprises inputting information from a customer into a web-enabled terminal and translating local language information into Unicode at said web-enabled terminal.

* * * * *